March 21, 1967  R. A. HEMSTREET ETAL  3,309,844
PROCESS FOR ADSORBING GASES
Filed Nov. 29, 1963  2 Sheets-Sheet 1

RUSSEL A. HEMSTREET
DONALD M. RUTTENBUR
INVENTORS

BY
ATTORNEY

United States Patent Office 3,309,844
Patented Mar. 21, 1967

3,309,844
PROCESS FOR ADSORBING GASES
Russell A. Hemstreet and Donald M. Ruttenbur, Kenmore, N.Y., assignors to Union Carbide Corporation, a corporation of New York
Filed Nov. 29, 1963, Ser. No. 326,949
3 Claims. (Cl. 55—75)

This invention relates to the adsorption of gases and, in particular, to the adsorption of gases employing an improved adsorbent material.

The production and maintenance of extremely high vacuums in chambers (e.g., in space simulation chambers) is becoming an increasingly important technological area. It has been proposed that gas adsorbents in thermal contact with cryogenic fluids (e.g., liquid or cold gaseous nitrogen) can be employed to remove substantially all remaining traces of gases in chambers that have been evacuated to about $10^{-6}$ torr by other evacuation means (e.g., by mechanical pumps and diffusion pumps). This use of cryogenic fluid-cooled adsorbents is based on the fact that the adsorption properties of gas adsorbents are generally markedly increased by cooling the adsorbents to very low temperatures. However, the amount of gas adsorbed by cryogenic fluid-cooled adsorbents, as well as the rate of gas adsorption by such adsorbents, is seriously affected when the adsorbent is exposed to a source of heat (e.g., a wall of the chamber whose outer surface absorbs heat from the outer environment and whose inner surface radiates such heat to the surface of the adsorbent). To overcome this loss of efficiency of gas adsorbents, it has been proposed that the adsorbent be shielded from the source of heat by interposing a barrier between the source of heat and the adsorbent. This solution requires an additional structural component in the chamber which may be undesirable or unfeasible in certain applications. The above problem is basically caused by poor heat transfer in the adsorbent and is illustrative of the problems arising with adsorbents having poor heat transfer properties.

It is an object of this invention to provide for the efficient adsorption of gases by adsorbents which may be exposed to a source of heat.

Further objects of this invention will be apparent from the following description of this invention.

Figure 1:
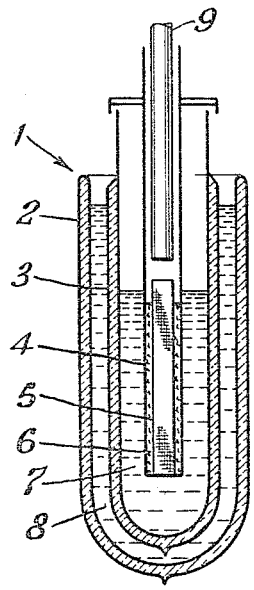
FIGURE 1 is a front view, partly in section, of an apparatus suitable for use in measuring the rate of adsorption of gases in accordance with the practice of this invention.

This invention provides a process for adsorbing a gas which process comprises contacting said gas with an agglomerate comprising a major amount of a finely divided crystalline zeolitic molecular sieve and a minor amount of a finely divided metal having a melting point over 300° C. uniformly dispersed throughout the agglomerate, said agglomerate being in thermal contact with a heat transfer fluid. This invention further provides agglomerate-coated panels admirably suited for use in adsorbing gases.

The gas adsorbents employed in the process of this invention are in the form of agglomerates which are mixtures of finely divided crystalline zeolitic molecular sieve and finely divided metals. In such agglomerates the crystalline zeolitic molecular sieve functions as a gas adsorbent while the finely divided metal functions as a heat transfer medium. The metal serves to maintain the molecular sieve at or near the temperature of the cryogenic liquid with which the agglomerate is in thermal contact even when the surface of the agglomerate is exposed to a source of heat. In this way, the finely divided metal serves to maintain the adsorption properties of the gas adsorbent (e.g., the capacity of the adsorbent and the rate at which the adsorbent adsorbs gases) at maximum efficiency.

It is desirable that both the crystalline zeolitic molecular sieves and the metals present in the agglomerates employed in the process of this invention be in a finely divided form, and it is also desirable that the molecular sieve be present in a major amount and the metal in a minor amount. In terms of particle size, it is preferable that the molecular sieve be composed of crystals of less than 10 microns individual size and the metal be in the form of particles having at least one dimension less than 50 microns. It is desirable that the ratio of metal particle size to the molecular sieve crystal size be at least 5 to 1. In terms of the relative amount of the molecular sieve and the metal, it is preferable that the metal constitutes from 5 to 30 weight-percent of the total weight of the molecular sieve and the metal.

In order to achieve uniform performance of the molecular sieves employed in the agglomerates in the process of this invention, it is desirable that the finely divided metal be uniformly dispersed throughout the agglomerate. Preferably, the metal has a melting point over 300° C. and is sintered to the outer surface of the molecular sieve crystals. In the latter case, the relatively large metal bodies act as elongated surfaces or "bridges" for the relatively small molecular sieve crystals. In this manner, several crystals are sintered to each metal body and most of these metal bodies are, in turn, sintered to other metal bodies, thereby providing an agglomerate which is mechanically and chemically bonded together. As used herein, "sintering" refers to the coalescence of the metal bodies and molecular sieve zeolite crystals into one solid mass through heating to temperature above ambient but below the melting or fusion temperature of the metal. Sintering involves molecular migration of the metal, and the rate of migration is a function of the vapor pressure of the metal involved. Higher temperatures provide higher rates of molecular migration. It is important to avoid heating the metal bodies to their melting point as melted bodies at least partially lose their integrity, thereby preventing the strong mechanical and thermal bond which gives the multicrystalline agglomerate its superior properties. Another reason why melting of the metal bodies should be avoided is that the flowing metal tends to block the uniformly sized small pores of the zeolite crystals and may even pass through the pores into the molecular sieve's three-dimensional inner cagework. Since the pores and inner cagework are among those characteristics which give molecular sieves their unique properties, melting of the metal bodies tends to reduce the utility of the multicrystalline agglomerate. Of course, simple mixtures of molecular sieves and metals can be used rather than the preferred sintered masses.

Among the metals suitable for use in the above described multicrystalline agglomerates are those of groups Ib, IIb, IIIa, IIIb, Va, Vb, VIb, VIIb, and VIII of the Periodic Table (Handbook of Chemistry and Physics, Thirty-Eighth Edition, page 394, Chemical Rubber Publishing Company, 1956). Silicon, germanium, lead, and tellurium are also suitable. Exemplary metals include, but are not limited to, copper, silver, and gold of group Ib; magnesium of group IIa; zinc of group IIb; boron and aluminum of group IIIa; yttrium of group IIIb; antimony of group Va; vanadium of group Vb; chromium of group VIb; manganese of group VIIb; and iron, nickel, platinum, and palladium of group VIII. Mixtures and alloys of these metals can also be employed. Metals or alloys suitable for use in the polycrystalline agglomerate should have melting points above 300° C. (preferably above 650° C.). This is because the molecular sieve usually contains water or other fluid in its internal cagework, and such materials are removed by heating to temperatures as high as 300° C. before the agglomerate is suitable for many uses. As previously discussed, melting of the metal bodies should be avoided if the agglomerate is to retain the characteristic mechanical and chemical bonding.

The metal bodies or particles employed in the above described agglomerates preferably have at least one dimension less than 50 microns, for example, the bodies should be sufficiently small to pass through a 325-mesh (44 microns width) U.S. Standard screen. These metal bodies are consequently in the form of powder, and preferably as "bronze powders". This expression refers to metallic flake-type powders as manufactured by a stamping or milling process generally for use in the printing, painting, and plastic arts. Alloys of aluminum and copper and alloys of copper with other metals (for example, zinc, silver, and gold) and the metals aluminum, copper, silver, and gold may all be formed into these bronze powders. Aluminum is preferred because of its light weight and low cost.

It has been previously indicated that the ratio of the metal body size to the zeolitic molecular sieve crystal size preferably be at least 5 to 1. This size relationship is desirable so that the metal bodies may act as elongated surfaces for attachment by the zeolite crystals where the agglomerate is sintered. For high strength, the preferred sintering bond should be primarily between the metal bodies and the zeolite crystals, although some degree of weaker crystal-to-crystal bonding also results from the sintering operation. If the size relationship were less than 5 to 1, a relatively large number of crystal-to-crystal bonds would result from the sintering operation and the agglomerate would not possess as high strength.

The crystalline zeolitic molecular sieves suitable for use in the agglomerates employed in the process of this invention are metal alumino-silicates which exist in three-dimensional crystalline form. Only the crystalline zeolites having the basic formula, $$M_{2/n}O:Al_2O_3:xSiO_2:yH_2O$$

where M represents an exchangeable cation and $n$ its valence, are termed zeolitic molecular sieves. In general, a particular crystalline zeolite will have values for $x$ and $y$ that fall within a definite range.

In zeolitic molecular sieves there is a framework of silicon-oxygen and aluminum-oxygen tetrachedra which is honeycombed with relatively large cavities normally filled with water molecules. Uniformly sized pores in the outer surface of the molecular sieve connect with these cavities, and the sieve may be activated by heating to effect loss of the water by hydration. This dehydration results in a very large surrface area within the inner cagework for adsorption of foreign molecules. Adsorption by molecular sieves is limited to molecules having size and shape such as to permit entrance through the pores to the inner adsorption region or cavities, large molecules being excluded.

The zeolitic molecular sieves useful in this invention include both those that occur in nature and those that may be synthesized. Among the suitable naturally occurring zeolitic molecular sieves are chabazite, erionite, mordenite, and faujasite, these being adequately described in the chemical art. Suitable synthetic zeolitic molecular sieves include zeolites A, D, L, R, S, T, X, and Y, as well as the mordenite-type material known commercially as Zeolon and described in Chemical and Engineering News, Mar. 12, 1956, pages 52–54.

Zeolite A is a crystalline zeolitic molecular sieve which may be represented by the formula, $$1.0 \pm 0.2 M_{2/n}O : Al_2O_3 : 1.85 \pm 0.5 SiO_2 : yH_2O$$

wherein M represents a cation such as sodium, calcium, strontium or magnesium, $n$ is the valence of M, and $y$ may have any value up to about 6. The as-synthesized zeolite A contains primarily sodium ions (i.e., M in the latter formula represents sodium) and is designated sodium zeolite A, described in more detail in U.S. Patent No. 2,882,243, issued April 14, 1959.

The pore size of the zeolitic molecular sieves may be varied by employing different metal cations (which are represented by M in the above formula). For example, sodium zeolite A has a pore size of about 4 Angstrom units whereas, when calcium cations have been exchanged for at least about 40% of the sodium cations, the sieve is designated calcium zeolite A and has a pore size of about 5 Angstrom units.

Zeolite X is a synthetic crystalline zeolitic molecular sieve which may be represented by the formula, $$0.9 \pm 0.2 M_{\frac{2}{n}}O : Al_2O_3 : 2.5 \pm 0.5 SiO_2 : yH_2O$$

wherein M represents a cation, particularly a cation of an alkali and alkaline earth metal, $n$ is the valence of M, and $y$ may have any value up to about 8, depending on the identity of M and the degree of hydration of the crystalline zeolite. Sodium zeolite X has an apparent pore size of about 10 Angstrom units.

Zeolite X, its X-ray diffraction pattern, its properties, and methods for its preparation are described in detail in U.S. Patent No. 2,882,244, issued April 14, 1959.

Zeolite Y is described and claimed in U.S. Patent Application Ser. No. 109,487, filed May 12, 1961, in the name of D. W. Breck, and issued Nov. 9, 1965 as U.S. Patent No. 3,130,007.

If desired, additional materials can be included with the zeolitic molecular sieve crystals and metal bodies to form the multicrystalline agglomerate used in the process of this invention. For example, clay minerals, alkali metal silicates, and organic casting resins are among materials that can be incorporated. Also, conventional clay binders may be incorporated (e.g., attapulgite, kaolin, sepiolite, polygarskite, kaolinite, plastic ball clays, clays of the attapulgite or kaolin types, bentonite, montmorillonite, illite, chlorite, and bentonite-type clay). They can be used in a plastic state allowing extrusion, molding, or casting of the agglomerate into shapes or application as coatings followed by a drying or curing step. As previously indicated, most end uses of the agglomerate require activation to remove water or other fluid from the internal pore system of the molecular sieve. In some instances the curing of the added binder or the heating of the pelleting mold may have accomplished this activation. Heating with a gaseous purge or vacuum is the usual activation procedure but, of course, the temperature level should be below the melting point of the metal and also below the destruction temperature of the molecular sieve crystals.

The agglomerates suitable for use in the process of this invention are prepared by any suitable method. One method involves intimately blending the finely divided crystalline zeolitic molecular sieve and the finely divided metal and thereafter compacting the mixture so formed under super-atmospheric pressure while maintaining the mixture at a temperature above 100° C. but below the destruction temperature of the crystals and also below the fusion point of the metal. Under these conditions, sintering of the metal particles to the molecular sieve crystals occurs, to produce the agglomerate.

Agglomerates suitable for use in the process of this invention are disclosed and claimed in U.S. Patent Application Serial No. 300,163, filed Aug. 6, 1963 and issued May 4, 1965 as U.S. Patent No. 3,181,231.

The improvements in gas adsorption resulting from the practice of this invention have been demonstrated in the apparatus shown in FIGURE 1. FIGURE 1 depicts an apparatus 1 composed of an outer Dewar flask 2, an inner Dewar flask 3, and a stainless tube 4 containing a copper screen 5, which, together with the tube, provide an annular space 6 filled with an agglomerate of the type described above. The intermediate space 7 between tube 4 and inner Dewar flask 3 is filled with liquid hydrogen which cools the tube and, in turn, the agglomerate in annular space 6 since the agglomerate is in good thermal contact with the tube. The outer annular space 8 between Dewar flask 3 and outer Dewar flask 2 is filled with liquid nitrogen which prevents excessive evaporation of the liquid hydrogen in space 7. The upper part of tube 5 is in gaseous communication with a hydrogen gas reservoir, a diffusion pump, a mass spectrometer for measuring the partial pressure of hydrogen, and an ion vacuum gauge for measuring the total pressure through conduit 9 (none of which are shown in FIGURE 1).

The operation of the apparatus of FIGURE 1 was as follows: From 120 to 160 grams of the agglomerate was placed in space 6. The adsorbent was activated by heating the entire apparatus at from 340° C. to 360° C. while evacuating the apparatus to a pressure of $10^{-7}$ torr over a period of 14 hours. The ancillary equipment (the ion gauge, the mass spectrometer, the associated valves, etc.) were concurrently heated at 450° C. This heating step served to remove adsorbed or absorbed gases from the agglomerate and from the remaining components of the apparatus and ancillary equipment. The apparatus was then cooled to ambient temperature. The portions of the apparatus shown in FIGURE 1 was isolated from the rest of the system by closing a valve in conduit 9, and liquid nitrogen was added to space 8, and liquid hydrogen was added to space 7. In all experiments the liquid hydrogen level was maintained at least 2–3 inches above the level of the agglomerate. Gaseous hydrogen was admitted to tube 5 at a known constant rate through conduit 9. The agglomerate is exposed to thermal radiation through conduit 9.

Using the above procedure, two agglomerates were tested in the apparatus of FIGURE 1. For comparison purposes, two adsorbents which were free of the metal particles present in the agglomerates, but which were otherwise identical with the agglomerates, were also tested. From the results obtained, the rates of adsorption of hydrogen gas by the agglomerates and the adsorbents were computed in accordance with equation $$S = \frac{Q}{P} \times \frac{10^{-3}}{60}$$

wherein S is the pumping speed (i.e. rate of adsorbtion) in liters of hydrogen adsorbed per second, Q is the rate at which gaseous hydrogen entered the tube in micron-liters per minute, and P is the partial pressure of hydrogen in the tube in torr. The following pumping speeds were calculated:

| Material tested: | Pumping speed(s) |
|---|---|
| An adsorbent consisting of 80 weight-percent of calcium zeolite A and 20 weight-percent of kaolin | 84.3 |
| An agglomerate consisting of 76 weight-percent of calcium zeolite A, 19 weight-percent of aluminum flakes | 4278 |
| An adsorbent consisting of 80 weight-percent of sodium zeolite A and 20 weight-percent of kaolin | 83.4 |
| An agglomerate consisting of 76 weight-percent of sodium zeolite A, 19 weight-percent of kaolin, and 5 weight-percent of aluminum flakes | 757 |

The particle size of calcium zeolite A was 3 to 5 microns, the particle size of sodium zeolite A was 3 to 5 microns, and the aluminum flakes were from 0.1 to 2 microns thick and from 50 to 100 microns wide. The results shown in the latter table illustrate the marked increase in pumping speed achieved by the process of this invention.

A preferred manner of using the above described agglomerates in accordance with the practice of this invention is to coat the agglomerates on panel walls that are adapted for rapid heating and cooling. Such coated panels form a part of this invention.

The panel walls in the coated panels suitable for use in the process of this invention are adapted for rapid heating and cooling. This is readily and preferably achieved by providing channels within the panel wall or by attaching cooling conduits to the panel wall. Heat transfer media can be passed through such channels or cooling conduits to heat or cool the panel wall as desired. Alternately, the panel walls (and, in turn, the agglomerate coatings thereon) can be heated or cooled by contacting the bottom, top or sides with a heating or cooling fluid. Such heat transfer media include refrigerated brine, liquid nitrogen, liquid hydrogen, liquid helium, cold gaseous nitrogen, cold gaseous hydrogen, and cold gaseous helium in those cases where it is desired to cool the panel wall. When it is desired to heat the panel wall, heat transfer media such as hot water, hot organic liquids (e.g., Dowtherm), or hot gases (e.g., hot air, hydrogen, nitrogen, helium, or steam) can be employed. Heating and cooling the panel wall results in a corresponding heating or cooling of the adsorbent since the adsorbent is in good thermal contact with the panel wall. Heating serves to release adsorbed gases from the adsorbent (i.e. activates the adsorbent), while cooling serves to improve the gas adsorbent properties of the adsorbent. Good heat transfer between the panel wall and the adsorbent is achieved by bonding the adsorbent to the wall in such a manner that no voids separate the adsorbent from the wall surface.

The panel wall suitable for use in the coated panels suitable for use in the process of this invention can be composed of a single sheet or of a plurality of sheets affixed together (e.g., by bolts or by welding or by brazing, or by soldering). Provided good heat transfer to the adsorbent and good bonding of the adsorbent can be achieved, the particular materials of which the panel walls are constructed are not critical. However, because of their excellent properties, metals—and particularly stainless steel, aluminum, and copper—are preferably the principal or only materials present in the panel walls. The particular configuration of the panel walls is not narrowly critical, and can be selected in view of the particular application for which the wall is intended. Thus, the panel walls can be curved or flat, and regularly or irregularly shaped (e.g. they can be tubes, rods, flat plates, spheres, etc.).

The thickness of the coating of agglomerate on the coated panels suitable for use in the process of this invention is not narrowly critical, and can be varied as desired to meet the particular requirements of any area of application. In general, it has been found that agglomerate coatings having a thickness from 0.01 to 0.25 inch are particularly satisfactory.

The agglomerate coating can be bonded to the panel wall in the coated panels suitable for use in the process of this invention by any suitable means. In general, it is preferred to bond the coating to the wall by a procedure which involves cleaning the panel wall, roughening the panel wall, and then applying to the panel wall a mixture of the agglomerate and an inorganic binder. The cleaning step can be accomplished employing steam, pickling solutions, organic solvents, aqueous solvents, and the like, alone or in various combinations, depending upon the initial condition of the panel wall and depending upon the particular material that comprises the panel wall. The roughening step can be accomplished in any of a variety of ways, including grit blasting, or milling the panel walls, or attaching a screen or metal raised metal portions on the panel wall which serves to fins to the panel wall. All of these methods provide lock the subsequently applied agglomerate to the panel wall. When a screen is used, it can be suitably fastened to the panel wall by first covering the panel wall with thin sheets of a brazing alloy, placing a metallic screen—preferably of relatively fine mesh—over the sheets of brazing alloy, heating the assembly to a temperature at which the brazing alloy melts, and then cooling the assembly. The brazing alloy then serves as a bonding agent between the panel wall and the screen. Alternately, the screen can be welded or soldered to the panel wall.

Suitable inorganic binders which can be employed to bond the agglomerate to the roughened panel wall include finely divided attapulgite, kaolin, sepiolite, polygarskite, kaolinite, plastic ball alloys, clays of the attapulgite or kaolin types, bentonite, monomorillonite, illite, chlorite, and bentonite-type clay. Such binders are premixed with the adsorbent, which is also preferably finely divided, and then applied to the roughened panel wall, preferably in the form of a slurry whose concentration can be varied to suit the thickness of the coating desired. Preferably the binder is present in an amount from 10 wt. percent to 30 wt. percent of the total weight of the molecular sieve, metal and binder. It is important that the adsorbent coating be substantially free of any organic binder (e.g., epoxy resin binders). Such organic binders impair the adsorbent properties of the adsorbent, are not thermally stable, and possess other deleterious properties.

After the agglomerate-binder mixture has been applied to the surface of the panel wall, it is desirable to heat the mixture to temperatures sufficiently elevated to cause the binder to set or cure so as to effectively bond the agglomerate to the panel wall. The temperature will be dependent upon the particular binder metal and adsorbent employed, but generally temperatures from 500° to 650° C. are suitable. The heating also serves to liberate water adsorbed by the zeolitic molecular sieve. The heating to set the agglomerate-binder mixture is preferably done in an atmosphere of an inert gas such as nitrogen or argon.

It has been found that the manner in which certain agglomerates are applied to metals to produce coated metal surfaces suitable for use in the process of this invention is important from the point of view of the ultimate performance of the agglomerate and from the point of view of safety. Specifically, it has been found that agglomerates containing aluminum or magnesium particles should not be applied in the form of aqueous slurries since the resulting coatings exhibit impaired adsorbent properties and since the hydrogen gas is evolved during the coating operation. The evolved hydrogen gas constitutes an explosion hazard. Accordingly, it is highly desirable to apply such agglomerates as slurries in organic liquids such as alcohols (e.g., methanol, ethanol, or propanol) or hydrocarbons (e.g., heptane, benzene, or toluene).

The following experiments illustrate the importance of avoiding the use of water in preparing slurries of aluminum-containing agglomerates.

(1) A mixture of 6 weight percent fine, grease-free aluminum flake, 75.5 weight percent pure calcium zeolite A, and 18.5 weight percent of a clay binder (kaolin) was compounded with excess water to make a thin slurry. After compounding, the slurry began to foam, and large quantities of gaseous hydrogen were detected (in one case an explosion resulted). The slurry was fired at 26° C. for 14 hours and then fired at 595° C. for 2 hours under a nitrogen atmosphere. The adsorption of gaseous hydrogen at 20° K. on the product was measured and compared with the adsorption of hydrogen on ordinary, unfilled calcium zeolite A prepared in the same way as the aluminum flake-filled 5A molecular sieve. The reaction between the interspersed metal particles and components of the molecular sieve in the presence of water greatly reduced the adsorptive capacity of the sieve.

(2a) A 5A molecular sieve slurry containing 5% aluminum flake was prepared as described in paragraph (1) immediately above. A milled aluminum plate, whose surface was studded with square pegs ($\frac{1}{16}''$ x $\frac{1}{16}''$ x $\frac{1}{16}''$) spaced $\frac{1}{16}''$ from each other, was cleaned in trichloroethylene, hot aqueous sodium hydroxide, and finally in water. The molecular sieve slurry was thickened (foaming did occur) and was forced into the spaces between the pegs on the aluminum plate. The plate with molecular sieve was dried at room temperature for 14 hours, then heated to 200° C. in air, cooled to room temperature, and fired at 590° C. for 2 hours under an inert atmosphere. The aluminum plate having calcium zeolite A containing interspersed aluminum flake bonded to its surface was cooled to −253° C. (20° K.) by placing its uncoated surface in contact with a metal container of liquid hydrogen. The cryosorption pumping speed of gaseous hydrogen on the adsorbent surface was measured. A pumping speed of 660 liters/sec./ft.² of adsorbent, measured at ambient temperatures, was obtained.

(2b) The steps used for compounding calcium zeolite A containing aluminum flake and the bonding of this adsorbent to a pegged aluminum surface were repeated exactly as described in paragraph (2a) above except that anhydrous ethyl alcohol was used in the slurry-compounding step. The plate was cooled to −253° C. (20° K.) and the cryosorption pumping speed of gaseous hydrogen on the adsorbent surface was measured. A pumping speed of 6,600 liters/sec./ft.² of adsorbent, measured at ambient temperatures was obtained, indicating that the use of a non-aqueous liquid for the formation of molecular sieve bodies containing interspersed metal particles reduces problems arising from reactions between the metal particles and components of the molecular sieve.

Figure 2:
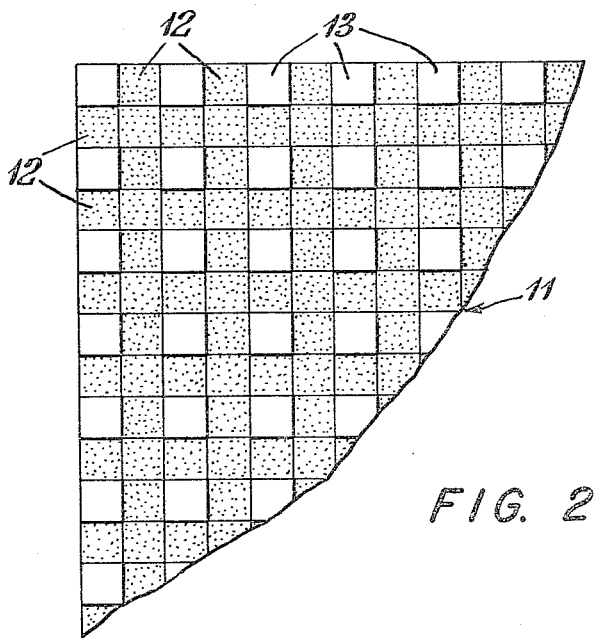
FIGURE 2 is a front view of a portion of an adsorbent-coated panel suitable for use in the process of this invention.

FIGURE 2 illustrates a coated panel which can be employed in the process of this invention. FIGURE 2 depicts a portion of a metal plate 11, the surface of which has been milled horizontally and vertically to provide parallel horizontal and vertical grooves 12 which are $\frac{1}{16}$ inch deep, $\frac{1}{16}$ inch wide, and spaced $\frac{1}{16}$ inch apart. As a result of this milling operation, the surface of the metal plate 11 is studded with small rectangular raised portions 13. These raised portions approximate cubes having $\frac{1}{16}$-inch sides. The grooves between the raised portions were filled with an agglomerate up to the level of the raised portions. The agglomerate used preferably contains one of the above-described clay binders to and the adherence of the agglomerate to the panel wall.

Figure 3:
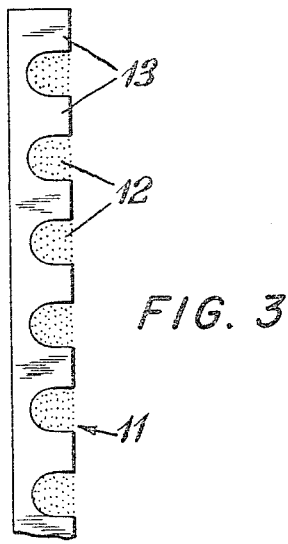
FIGURE 3 is an edge view in section of a portion of the panel of FIGURE 2.

FIGURE 3 is a side view of the coated panel of FIGURE 2, showing the raised portions 13 produced on the surface of the metal plate by milling. FIGURE 3 also shows the adsorbent coated on the panel in the grooves 12 between the raised portions 13.

The following procedure illustrates the production of another coated panel suitable for use in this invention. An agglomerate composed of 4 weight percent fine, grease-free aluminum flake, 12.0 weight percent clay binder, 30.5 weight percent unactivated calcium zeolite A, and 53.5 weight percent water was intimately mixed. An aluminum plate having rows of aluminum fins, $\frac{3}{16}$- inch high and spaced ⅛ inch apart, brazed to its surface was cleaned first in trichloroethylene, hot aqueous sodium hydroxide, and finally in water. The molecular sieve slurry was poured into the spaces between the fins. It was worked with a troweling tool as it dries at ambient temperature. A putty-like-consistency material was obtained in about one hour. This is allowed to further dry at ambient temperature for at least 15 hours. It is placed in a furnace that was swept with dry nitrogen gas and held at 100° C. for at least one hour, and then the temperature was brought up 595° C. in steps of 100° C. per hour. It was held at 595° C. for at least one hour. This completed the firing. A bond was established between the molecular sieve material and the aluminum surfaces which withstood repeated cycling between ambient temperatures and 77° K.

The following procedure illustrates the production of a panel similar to that depicted in FIGURES 2 and 3. An agglomerate identical to that applied to the finned panel as described above was prepared. An aluminum plate, whose milled surface was studded with square pegs (1/16″ x 1/16″ x 1/16″) spaced 1/16 inch from each other, was cleaned in the same manner as the finned panel. The agglomerate was applied to the panel and allowed to dry at ambient temperatures for 14 hours. The panel was heated to 200° C. in an air atmosphere and allowed to cool at ambient temperatures. It was then placed in a furnace in which a dry nitrogen gas purge is maintained and held at 100° C. for one hour, and then the temperature was brought up to 590° C. for two hours. A bond was established between the molecular sieve material and the aluminum surface which withstood repeated cycling between 120° C. and −253° C. (20° K.).

Figure 4:
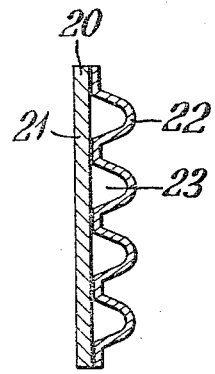
FIGURE 4 is an edge view in section of a panel wall which can be coated with an adsorbent and employed in the process of this invention.

FIGURE 4 is an edge view in section of a panel wall suitable for retaining an agglomerate used in the process of this invention. The panel wall 20 consists of flat sheet 21 welded to corrugated sheet 22. The corrugations provide conduits or channels 23 for the flow of a heat transfer medium through the panel wall.

Figure 5:
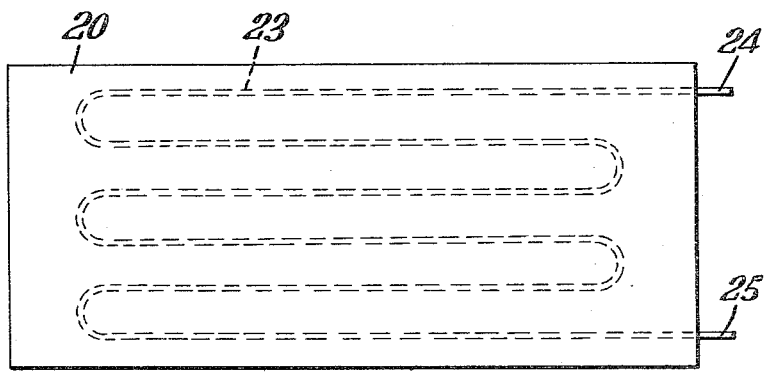
FIGURE 5 is a front view of the panel wall of FIGURE 4.

FIGURE 5 shows how the corrugations of FIGURE 4 join at the ends of the panel wall so as to define continuous conduits or channels 23 through panel wall 20. Conduits 24 and 25 provide means for the flow of a heat transfer medium into and out of the channels 23.

Figure 6:
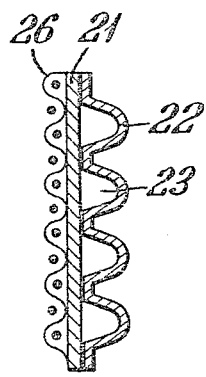
FIGURE 6 is an edge view in section of the panel wall of FIGURE 4 covered with a screen suitable for retaining an adsorbent.

FIGURE 6 shows a screen 26 attached (e.g., by brazing) to the outer surface of sheet 21 of the panel wall of FIGURE 4. The screen aids in the adherence of the later-applied agglomerate to the panel wall.

Figure 7:
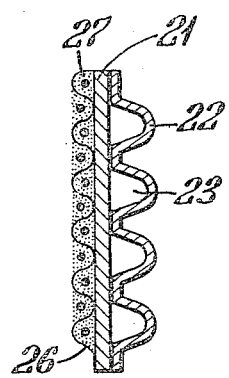
FIGURE 7 is an edge view in section of the screen-covered panel wall of FIGURE 6, wherein the screen retains an adsorbent suitable for use in the practice of the invention.

FIGURE 7 shows an agglomerate 27 bonded to the screen-covered panel wall of FIGURE 6. The agglomerate preferably contains one of the above-described clay binders.

A coated panel suitable for use in the process of this invention of the type depicted by FIGURE 7 can be prepared as follows:

(1) The surface of the panel wall to which the adsorbent is to be bonded is cleaned with a commercially available pickling solution. Both the flat sheet 21 and the corrugated sheet 22 are composed of stainless steel having a thickness of 1/16 inch. The corrugations can be ⅝ in. high and 1¼ inch wide at the base. A panel wall Type S–16 sold by the Dean Products Company is suitable. A stainless steel screen 26 of 16 mesh having a wire diameter of about 18/1000 inch is similarly cleaned with a standard pickling solution.

(2) The panel wall and the screen are further cleaned by washing with ethanol, contacting them with steam, and then rinsing them with distilled water.

(3) Excess moisture is removed from the panel wall and the screen by passing dry nitrogen gas over them.

(4) Thin strips of a silver-copper brazing alloy are laid on the flat surface of the panel wall.

(5) The wire screen is placed over the sheets of the brazing alloy, and the entire assembly is clamped together.

(6) The entire assembly is placed in an oven and is heated to 1300° F. to melt the brazing alloy.

(7) The assembly is removed from the oven and washed with hot water and acid.

(8) The assembly is further cleaned by passing steam over the surface, and then distilled water.

(9) Excess surface moisture is removed from the assembly by passing dry nitrogen gas over it.

(10) An alcoholic slurry containing 38 weight percent alcohol, 47.1 weight percent unactivated calcium zeolite A, 3.1 weight percent of finely divided aluminum, and 11.8 weight percent kaolin is applied to the surface of the panel wall covered with the screen.

(11) The entire assembly is again placed in an oven in which was maintained an atmosphere of dry nitrogen gas. The temperature of the oven is raised slowly to approximately 600° C. The oven is maintained at 600° C. for two hours, and then the assembly is cooled to room temperature by passing cooled dry nitrogen gas over the assembly. The thickness of the coating of the agglomerate on the panel wall is from 1/64 to 1/32 inch.

The coated panels of this invention can be used in any of a number of applications. They are especially adapted for use in pumping systems employed to produce vacuums as low as $10^{-10}$ torr. In such applications they are conveniently employed in conjunction with conventional pumping means. By way of illustration, the coated panels can be employed along with mechanical pumps, diffusion pumps, and cryogenic condensation pumps to achieve such vacuums. In such areas the mechanical pumps can be used to lower the pressure to $10^{-6}$ torr then the diffusion pumps can be used to lower the pressure further—to $10^{-6}$ to $10^{-7}$ torr, and the combination of the cryogenic condensation pumps and the coated panels of this invention can be employed to still further reduce the pressure to $10^{-10}$ torr. In such systems is preferred that the adsorbent on the coated panels of this invention is a zeolitic molecular sieve bonded to the panel wall with one of the above-described inorganic binders.

The non-pourous (i.e., gas-impermeable) nature of the panels of this invention makes them suitable for use as the outer walls in vacuum enclosures. In such cases the coated surface of the panel is oriented toward the inside of the enclosure so as to aid in producing or maintaining the vacuum.

The gases which can be adsorbed by the coated panels of this invention include oxygen, nitrogen, hydrogen, helium, argon, vaporized organic liquids, carbon dioxide, water, etc.

The agglomerates used in the process of the invention can be employed in any of the forms in which conventional gas adsorbents are employed and need not be employed coated on panels (although such is a preferred method). Thus the agglomerate can be employed as beds through which the gas to be adsorbed is passed.

Although this invention has been described above largely in connection with evacuating chambers employing agglomerates cooled with cryogenic fluids, it is also generally applicable in other areas where gas adsorbents are exposed to sources of heat which impair the performance of the adsorbents. Such sources of heat include the heat of adsorption of the gas adsorbed as well as radiation from the surrounding environment, etc. Hence this invention is not limited to any temperature range and the heat transfer medium can be at a temperature well above cryogenic temperatures during adsorption in certain applications. The important consideration is that the heat transfer medium remove heat from the agglomerate so as to mitigate the deleterious effects of heat on the agglomerate. The heat transfer medium is preferably in indirect thermal contact with the agglomerate (i.e., they are not in direct physical contact but are separated by a thermally conducting material, e.g., a metallic panel wall)

since direct contact may impede the desired gas adsorption.

What is claimed is:

1. A process for adsorbing a gas, which process comprises providing said gas at a first temperature and contacting said gas with a solid agglomerate and simultaneously cooling such agglomerate to a second lower temperature by heat exchange with a colder solid surface in contiguous association therewith, said agglomerate comprising a major amount of a finely divided crystalline zeolitic molecular sieve adsorbent and a minor amount of a finely divided elemental metal having a melting point over 300° C. uniformly dispersed throughout the agglomerate.

2. The process of claim 1 wherein the molecular sieve is zeolite A and the metal is aluminum.

3. A process for adsorbing a gas, which process comprises contacting said gas at a first temperature with an agglomerate comprising a major amount of crystalline zeolitic molecular sive adsorbent crystals of less than 10 microns individual size and a minor part of metal bodies having a melting point over 300° C. and at least one dimension less than 50 microns such that the ratio of metal body size to the zeolitic molecular sieve crystal size is at least 5 to 1, the metal bodies being uniformly dispersed throughout the agglomerate in quantity sufficient to constitute between about 5 and 30% by weight of the agglomerate and sintered to the outer surface of the molecular sieve crystals; and cooling said agglomerate to a second lower temperature simultaneously, before said contacting by indirect thermal contact with a colder fluid.

References Cited by the Examiner

UNITED STATES PATENTS

| | | | |
|---|---|---|---|
| 1,843,446 | 2/1932 | Drager | 55—387 X |
| 2,859,257 | 11/1958 | Hess et al. | 55—75 X |
| 2,885,368 | 5/1959 | Hess et al. | 55—75 X |
| 2,924,630 | 2/1960 | Fleck et al. | 55—75 |
| 2,973,327 | 2/1961 | Mitchell et al. | 252—449 |
| 3,043,127 | 7/1962 | De Ford et al. | 55—67 |
| 3,181,231 | 5/1965 | Breck | 23—111 X |

FOREIGN PATENTS

| | | |
|---|---|---|
| 692,129 | 5/1940 | Germany. |
| 320,450 | 10/1929 | Great Britain. |

REUBEN FRIEDMAN, *Primary Examiner.*

J. ADEE, *Assistant Examiner.*